US008037750B2

(12) United States Patent
Heuer et al.

(10) Patent No.: US 8,037,750 B2
(45) Date of Patent: Oct. 18, 2011

(54) IMPENDING ICING PROBE WITH THERMAL ISOLATION PEDESTAL

(75) Inventors: Weston D. C. Heuer, Maple Grove, MN (US); Brian Kane, Apple Valley, MN (US); Charles Willcox, Eden Prairie, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 210 days.

(21) Appl. No.: 12/608,104

(22) Filed: Oct. 29, 2009

(65) Prior Publication Data

US 2011/0106331 A1    May 5, 2011

(51) Int. Cl.
   *G05D 23/19* (2006.01)
(52) U.S. Cl. .................................... 73/170.26
(58) Field of Classification Search .................. None
   See application file for complete search history.

(56) References Cited

U.S. PATENT DOCUMENTS

| | | | |
|---|---|---|---|
| 3,057,198 A | 10/1962 | Crouchman | |
| 3,276,254 A | 10/1966 | Richard | |
| 3,940,622 A | 2/1976 | Stallabrass et al. | |
| 4,210,021 A | 7/1980 | Vykhodtsev et al. | |
| 4,980,673 A | 12/1990 | Kleven | |
| 5,003,295 A | 3/1991 | Kleven | |
| 5,140,135 A | 8/1992 | Freeman | |
| 5,313,202 A | 5/1994 | Hansman, Jr. et al. | |
| 5,354,015 A | 10/1994 | Meador | |
| 5,575,440 A | 11/1996 | LeBlond et al. | |
| 6,269,320 B1 | 7/2001 | Otto | |
| 6,320,511 B1 | 11/2001 | Cronin et al. | |
| 6,609,825 B2 | 8/2003 | Ice et al. | |
| 6,759,962 B2 | 7/2004 | Severson et al. | |
| 7,104,502 B2 | 9/2006 | Otto et al. | |
| 7,416,329 B2 | 8/2008 | Severson | |
| 2009/0149997 A1* | 6/2009 | Stothers | 700/275 |
| 2009/0224104 A1* | 9/2009 | Tenebre et al. | 244/134 R |

OTHER PUBLICATIONS

D.G. Jackson, D.J. Cronin, J.A. Severson and D.G. Owens, "AIAA-2001-0679 Ludlam Limit Considerations on Cylinder Ice Accretion: Aerodynamics and Thermodynamics", 39th Aerospace Sciences Meeting and Exhibit, Jan. 8-11, 2001, 21 pages, American Institute of Aeronautics and Astronautics.
D.G. Jackson, D.G. Owens, D.J. Cronin and J.A. Severson, "AIAA-2001-0398 Certification and Integration Aspects of a Primary Ice Detection System", 39th Aerospace Sciences Meeting and Exhibit, Jan. 11, 2001, 15 pages, American Institute of Aeronautics and Astronautics.
Aerospace Information Report SAE AIR 4367, "Aircraft Ice Detectors and Icing Rate Measuring Instruments", Issued Apr. 1995, Society of Automotive Engineers Inc., 24 pages.
Aerospace Standard SAE AS 8181, "Detector, Ice, Air Intake Duct, Aircraft Engines and Airframe Systems, General Specification For" Issued Aug. 1997, Society of Automotive Engineers Inc., 18 pages.
Alan Woolley, "Johnson Williams Liquid Content Probe," http://www.faam.ac.uk/public/jw/index.html, Oct. 5, 2009.
"PMS/CSIRO Hot Wire Liquid Water Probe," http://www.eol.ucar.edu/raf/Bulletins/B24/KingLwc.html, Oct. 5, 2009.

* cited by examiner

*Primary Examiner* — Andre Allen
(74) *Attorney, Agent, or Firm* — David C. Bohn; Westman, Champlin & Kelly, P.A.

(57) ABSTRACT

In an icing condition detection system, a circuit provides an output representing impending icing conditions as a function of power consumption of a single element detector. A thermal isolation pedestal includes a detector support end that supports the single element detector and an opposite strut mounting end. A thermal isolation controller controls a thermal isolation pedestal temperature to thermally isolate the single element detector from a strut mounting end.

20 Claims, 14 Drawing Sheets

IMPENDING ICING PROBE WITH THERMAL ISOLATION PEDESTAL

FIELD OF THE INVENTION

The present invention relates generally to thermal icing condition detection on aircraft.

BACKGROUND OF THE INVENTION

Various types of thermal icing condition detectors for aircraft are known. Thermal icing condition detectors typically include a "wet" thermal sensor that is exposed to atmospheric conditions including water and ice, and a "dry" thermal sensor that is shielded from icing. The shielding from icing typically uses complex internal probe passageways to separate water and ice from the "dry" thermal sensor. The internal passageways are expensive to construct, difficult to inspect, and subject to plugging with debris during use, and difficult to clean.

Embodiments of the present invention provide solutions to these and other problems, and offer other advantages over the prior art.

SUMMARY OF THE INVENTION

Disclosed is an icing condition detection system. The icing condition detection system comprises a single element detector. The icing condition detection system comprises a circuit that provides an output representing impending icing conditions as a function of power consumption of the single element detector.

The icing condition detection system comprises a thermal isolation pedestal. The thermal isolation pedestal includes a detector support end that supports the single element detector. The thermal isolation pedestal includes an opposite strut mounting end.

The icing condition detection system comprises a thermal isolation controller. The thermal isolation controller controls a thermal isolation pedestal temperature to thermally isolate the single element detector from the strut mounting end.

Other features and benefits will be apparent upon reading the following detailed description and review of the drawings.

DETAILED DESCRIPTION OF ILLUSTRATIVE EMBODIMENTS

In the embodiments described below, an icing condition detection system includes a thermal isolation pedestal that supports a single element thermal detector of icing conditions. The detector is heated to a temperature above ambient temperature, and a thermal isolation controller controls the temperature of the thermal isolation pedestal to equal the temperature of the single element detector. Since the detector and the thermal isolation pedestal are at the same temperature, there is no heat flow between the detector and the thermal isolation pedestal. Power consumption readings from the single element thermal detector are thus not contaminated by heat flows through the thermal isolation pedestal from a mounting strut. The mounting strut is heated to keep it free of ice. The single element detector is thermally isolated from its mounting strut. Air data from other aircraft sensors is provided to the icing condition detection system, eliminating any need for a "dry" air sensor in the icing condition detection system. The icing condition detection system senses impending icing conditions and provides an output that warns of icing before icing occurs. The impending icing conditions comprise the presence of water in the atmosphere, airspeed, temperature of atmosphere, or other atmospheric conditions such as total air temperature.

Figure 1:
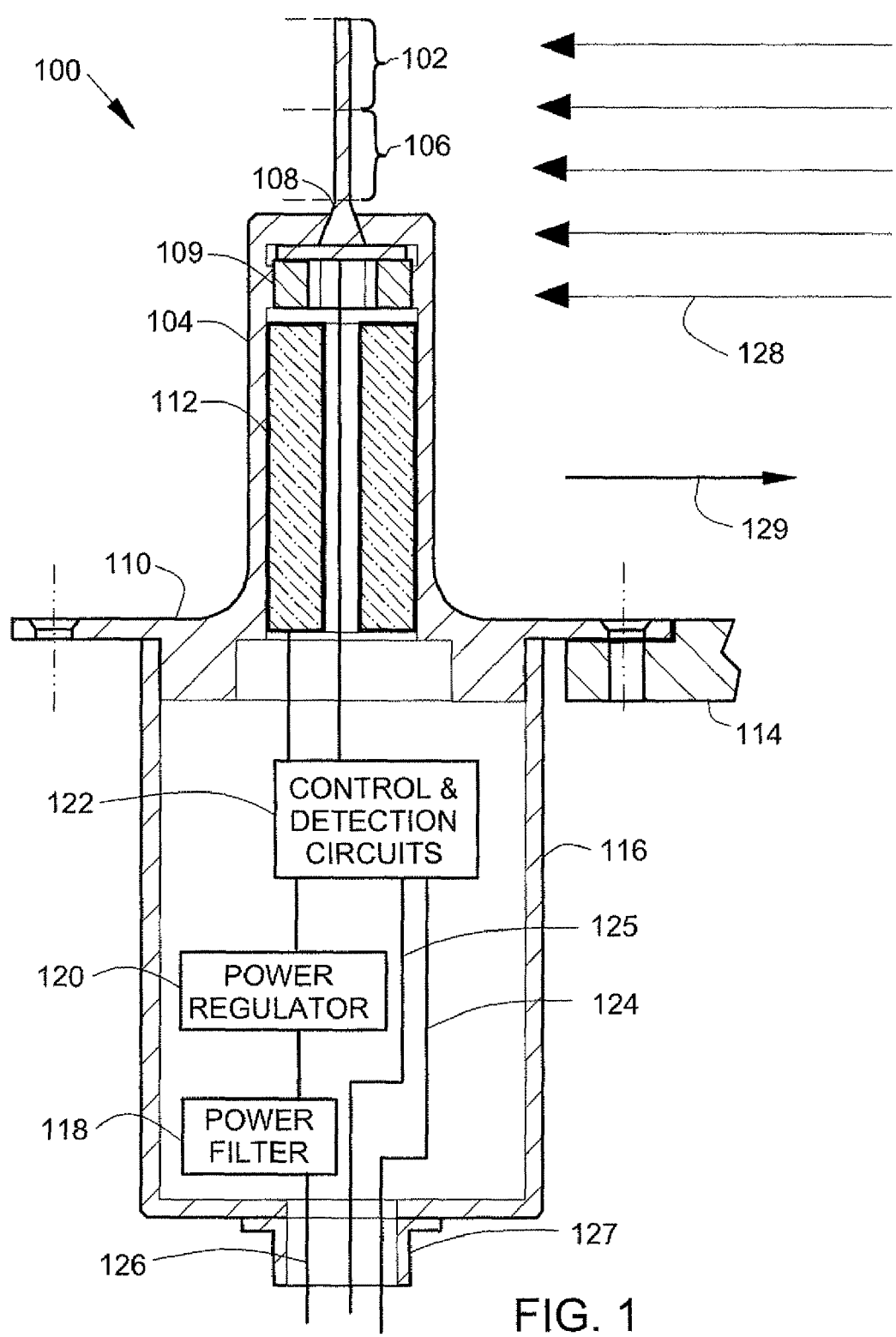
FIG. 1 illustrates a thermal icing condition probe.

FIG. 1 illustrates an icing condition probe 100 that is useful for detection of impending icing conditions as well as actual icing conditions. The icing condition probe 100 comprises a detector 102, a strut 104 and a thermal isolation pedestal 106. The detector 102 and the thermal isolation pedestal 106 are portions of an assembly 108 that is illustrated in more detail in FIG. 2. The strut 104 comprises a strut mount 110 that is adapted to mount to an aircraft skin 114. According to one aspect, the strut mount 110 comprises a circular flange with holes for mounting screws as illustrated. The strut 104 comprises a strut heater 112 that is electrically energized. The strut heater 112 maintains the strut 104 at a high enough temperature to prevent icing of the strut 104. The strut 104 and the thermal isolation pedestal 106 position the detector 102 outside of a boundary layer flow along the aircraft skin 114. The air passing over the detector 102 is not contaminated with boundary layer flow.

The thermal isolation pedestal 106 is mounted on the strut 104. The thermal isolation pedestal 106 supports the detector 102 in an air flow 128. The detector 102 is subject to convective properties of the air flow 128. The thermal isolation pedestal 106 is actively maintained at the temperature of the detector 102 in order to thermally isolate the detector 102 from temperature variations of the heated strut 104. The active heating of the detector 102 and thermal isolation pedestal 106 also serves to device the detector 102 and the pedestal 106 so that ice does not build upon the detector 102 and pedestal 106. The thermal isolation pedestal 106 is thermally conductive, but because of the controlled active heating, behaves as if it were a thermal insulator for the detector 102. There is essentially no heat flow between the detector 102 and the pedestal 106 because the thermal isolation pedestal 106 is actively heated under closed loop control to have the same temperature as the detector 102.

According to one aspect, an electronics housing 116 is attached to an underside of the strut mount 110. The electronics housing 116 surrounds a power filter circuit 118, a power regulator circuit 120 and control and detection circuits 122. Power is provided to the icing condition probe along a power line 126.

The control and detection circuits 122 connect to resistive sensing elements in the detector 102 and the thermal isolator pedestal 106. The control and detection circuits 122 energize the resistive sensing elements and sense the resistances of the resistive sensing elements. The resistive sensing elements are described in more detail below in connection with FIG. 2.

The control and detection circuits 122 provide a probe output 124. The probe output 124 is a function of detector power consumption as an indication of impending icing conditions in the air flow 128 which can include water or ice. The probe output 124 and probe power line 126 are connected to a wiring system of an aircraft through a standard connector 127. The aircraft wiring system provides air data from other aircraft sensors to the probe 100 on line 125. The probe relies on the air data for airspeed and air temperature data for compensation. The probe 100 does not have a "dry air" transducer of any kind. According to one aspect, the standard connector 127 provides an ARINC interface with aircraft wiring. According to another aspect, the standard connector 127 provides a CANBUS interface with aircraft wiring.

Figure 2:
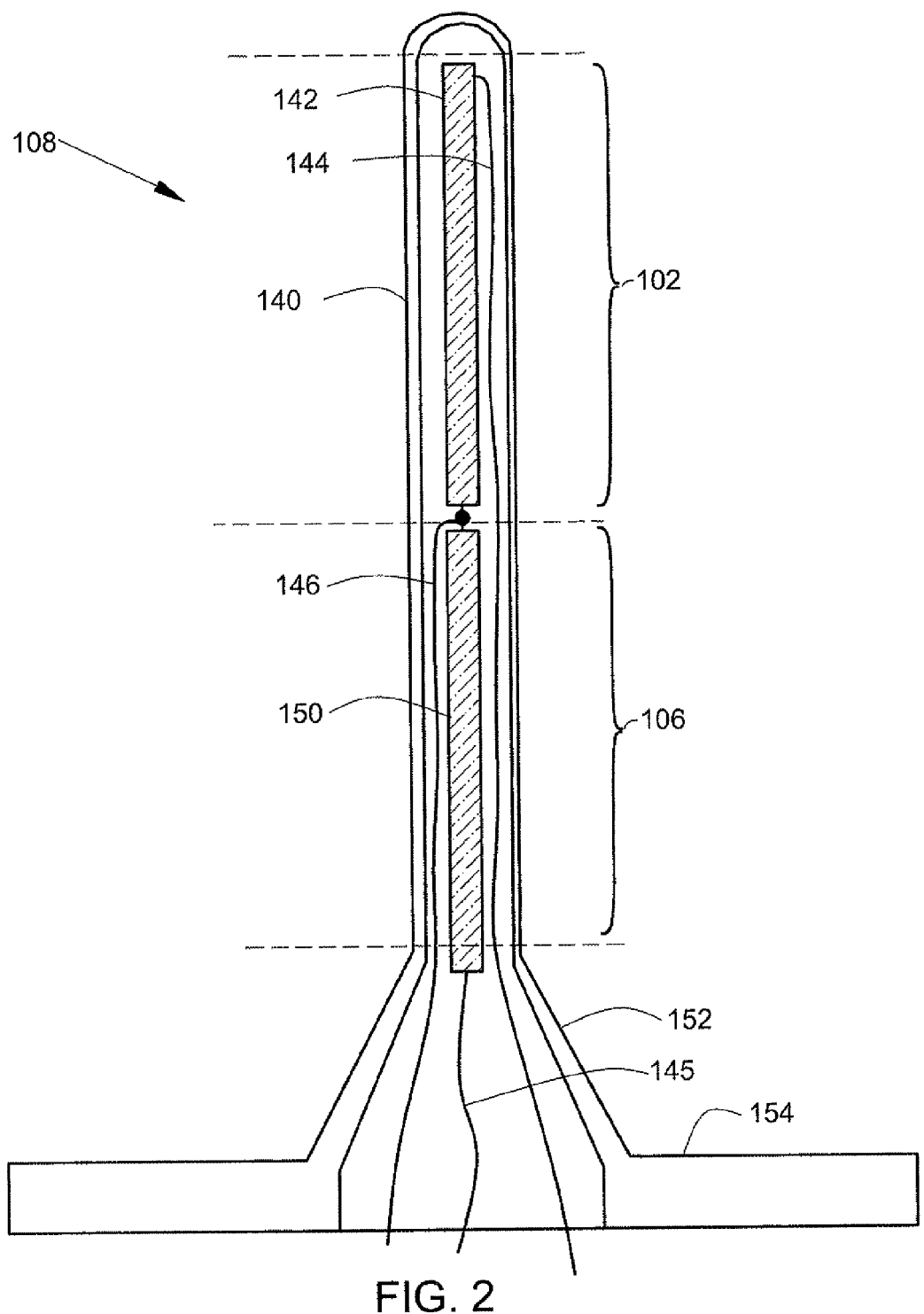
FIG. 2 illustrates an assembly of a detector and a thermal isolation pedestal.

FIG. 2 illustrates the assembly 108 of FIG. 1 in more detail. As illustrated in FIG. 2, the assembly includes an outer housing 140 that is formed of a thermally conductive metal alloy such as an aluminum alloy or a copper alloy.

The assembly 108 includes a first resistive sensing element 142 inside the detector 102. The first resistive sensing element 142 is powered by current from electrical leads 144, 146 to be heated and to maintain a regulated detector temperature. The first resistive sensing element 142 provides probe output voltages, also on leads 144, 146, that represent detector power consumption as an indication of impending icing conditions in an air flow. According to one aspect, the first resistive sensing element 142 comprises a platinum resistance thermometer. According to another aspect, the first resistive sensing element produces heat uniformly along its length, ensuring that the regulated detector temperature is uniform along a length of the detector 102. The detector 102 has an external surface that comprises a right circular cylinder that is circularly symmetrical to be insensitive to angle of attack (AOA).

The thermal isolation pedestal 106 includes a second resistive sensing element 150. The second resistive sensing element 150 is powered to maintain a regulated thermal isolation pedestal temperature that is equal to the regulated detector temperature within a regulated temperature range as described in more detail below in connection with FIG. 4. The second resistive sensing element 150 is powered by current from electrical leads 145, 146 to be heated and to maintain a regulated pedestal temperature. The second resistive sensing element 150 provides probe output voltages, also on leads 145, 146, that represent pedestal power consumption and temperature. According to one aspect, the second resistive sensing element 150 comprises a platinum resistance thermometer. According to another aspect, the second resistive sensing element produces heat uniformly along its length, ensuring that the regulated detector temperature is uniform along a length of the detector pedestal 106. The pedestal 106 has an external surface that comprises a right circular cylinder that is circularly symmetrical to be insensitive to angle of attack (AOA).

The assembly 108 comprises a conical tapered section 152 that is pressed against and seals to a body of strut 104. According to one aspect, O-rings or other known sealing materials are compressed between the conical tapered section 152 and the body of strut 104 to form a watertight seal.

The assembly 108 comprises an annular flange 154 that fits inside the body of the strut 104. An externally threaded washer 109 (FIG. 1) has threads that engage the interior wall of the strut 104. The washer 109 is advanced by turning to press against the annular flange 154 to provide a secure mounting. The threaded washer 109 is removable so that the assembly 108 is replaceable. According to one aspect, one or more thrust washers are placed between the annular flange 154 and the externally threaded washer 109.

Figure 3:
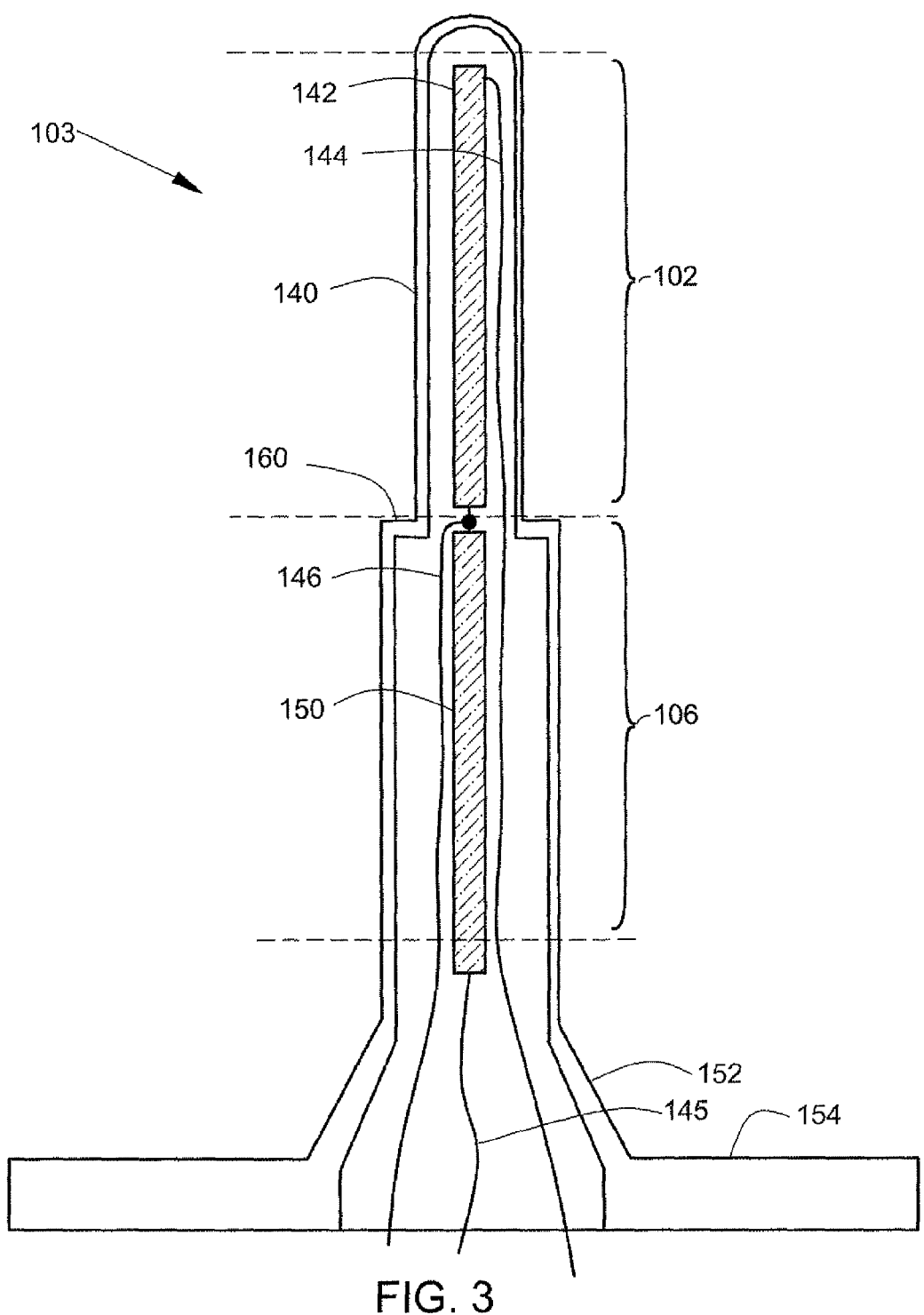
FIG. 3 illustrates an assembly of a detector and a thermal isolation pedestal that comprises a step.

FIG. 3 illustrates an assembly 103 which is similar to the assembly 108 except that the assembly 103 comprises a step 160 between a narrower diameter detector 102 and a larger diameter thermal isolation pedestal 106. In other respects, the assembly 103 in FIG. 3 is similar to the assembly 108 in FIG. 2. For the sake of brevity, reference numbers used in FIG. 3 are the same reference numbers used in FIG. 2.

Figure 4:
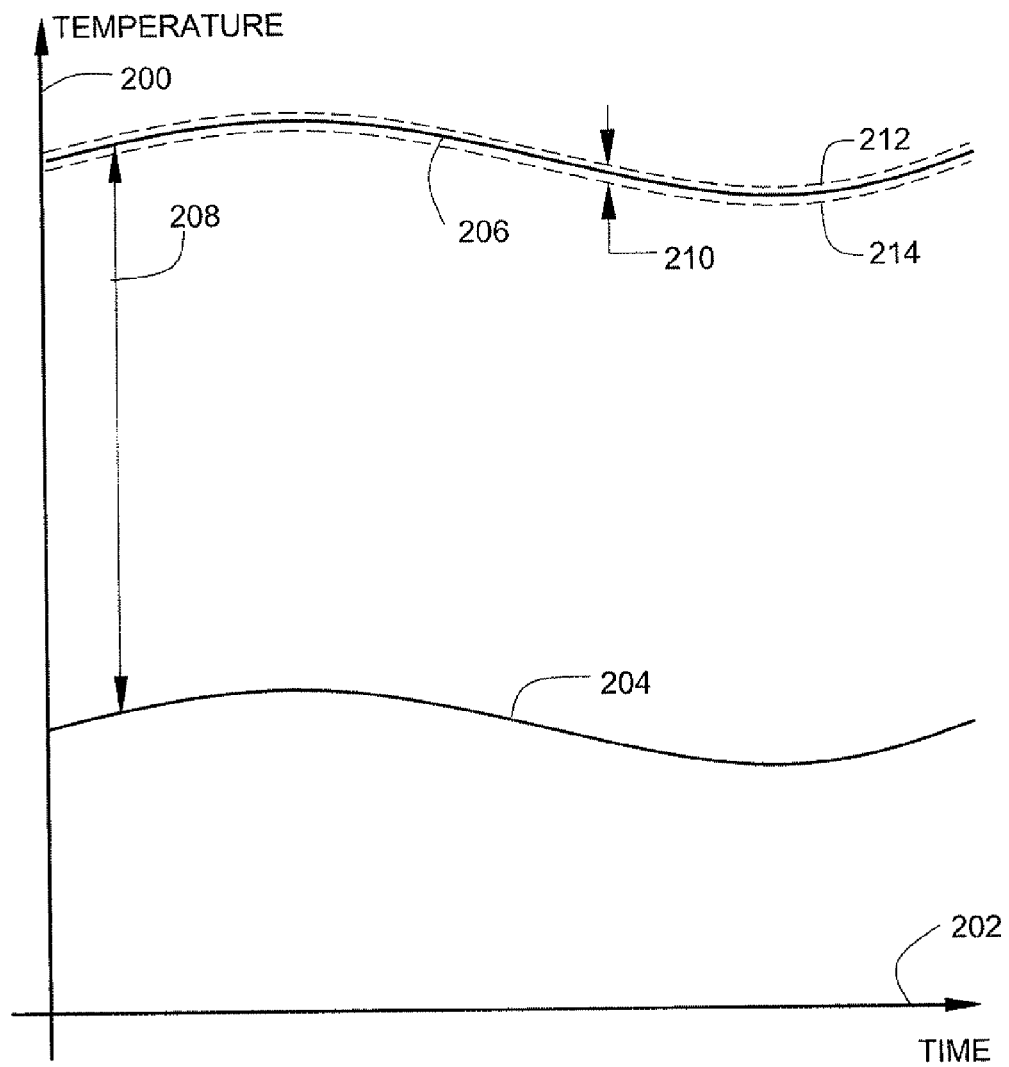
FIG. 4 illustrates a graph of a range of temperature regulation of a thermal isolation pedestal temperature.

FIG. 4 illustrates a graph of an example of regulation of the regulated detector temperature and the thermal isolation pedestal temperature. In FIG. 4, a vertical axis 200 is representative of temperature and a horizontal axis 202 is representative of time.

A line 204 is representative of a temperature of an airflow such as airflow 128 in FIG. 1. The temperature of the airflow is not sensed by the probe 100. The temperature of the airflow is sensed by one or more other air data sensors and provided to the probe 100 as air data. The temperature of the airflow is communicated to the probe 100 as an electrical signal to the probe 100 on line 125 in FIG. 1.

A line 206 is representative of the regulated detector temperature. In the example illustrated in FIG. 4, the regulated detector temperature is regulated to be higher than the temperature of the airflow by a temperature offset 208. According to one aspect, the temperature offset is a fixed temperature difference. According to another aspect, the fixed temperature difference is +80 degrees centigrade above total air temperature (TAT) (as received on line 125 in FIG. 1).

An example of a range of regulation 210 of the temperature of the thermal isolation pedestal 106 is illustrated by broken lines 212, 214 in FIG. 4. The temperature of the thermal isolation pedestal 106 is regulated to nominally equal the detector temperature 206. However, there is a small range of regulation 210 to ensure stability of the regulation over varying operating conditions. According to one aspect, the range of regulation 210 is less than 5 degrees centigrade. Regulation of the temperatures of the detector and the thermal isolation pedestals are describe in more detail below in connection with FIGS. 6-13.

Figure 5:
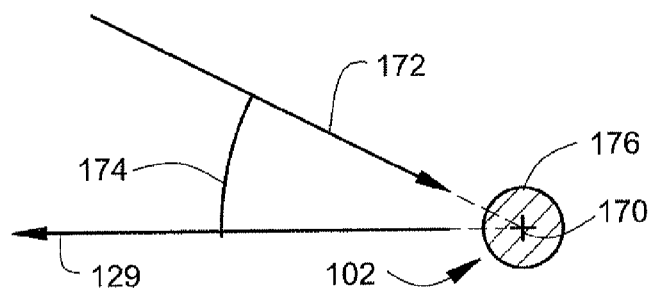
FIG. 5 illustrates a symmetrical cylindrical external surface of a detector and an angle of attack.

As shown in FIG. 5, the detector 102 comprises a generally round cylindrical external surface 176 that has a major axis 170 that is transverse to a forward axis 129 (FIGS. 1, 5) of the probe. A direction 172 of air flow remains transverse to the major axis over a range of angles of attack (AOA) 174 of the air flow. The generally round cylindrical external surface 176 is symmetrical and transfers a convective heat flow to the airflow that is insensitive to changes of angle of attack 174.

Figure 6:
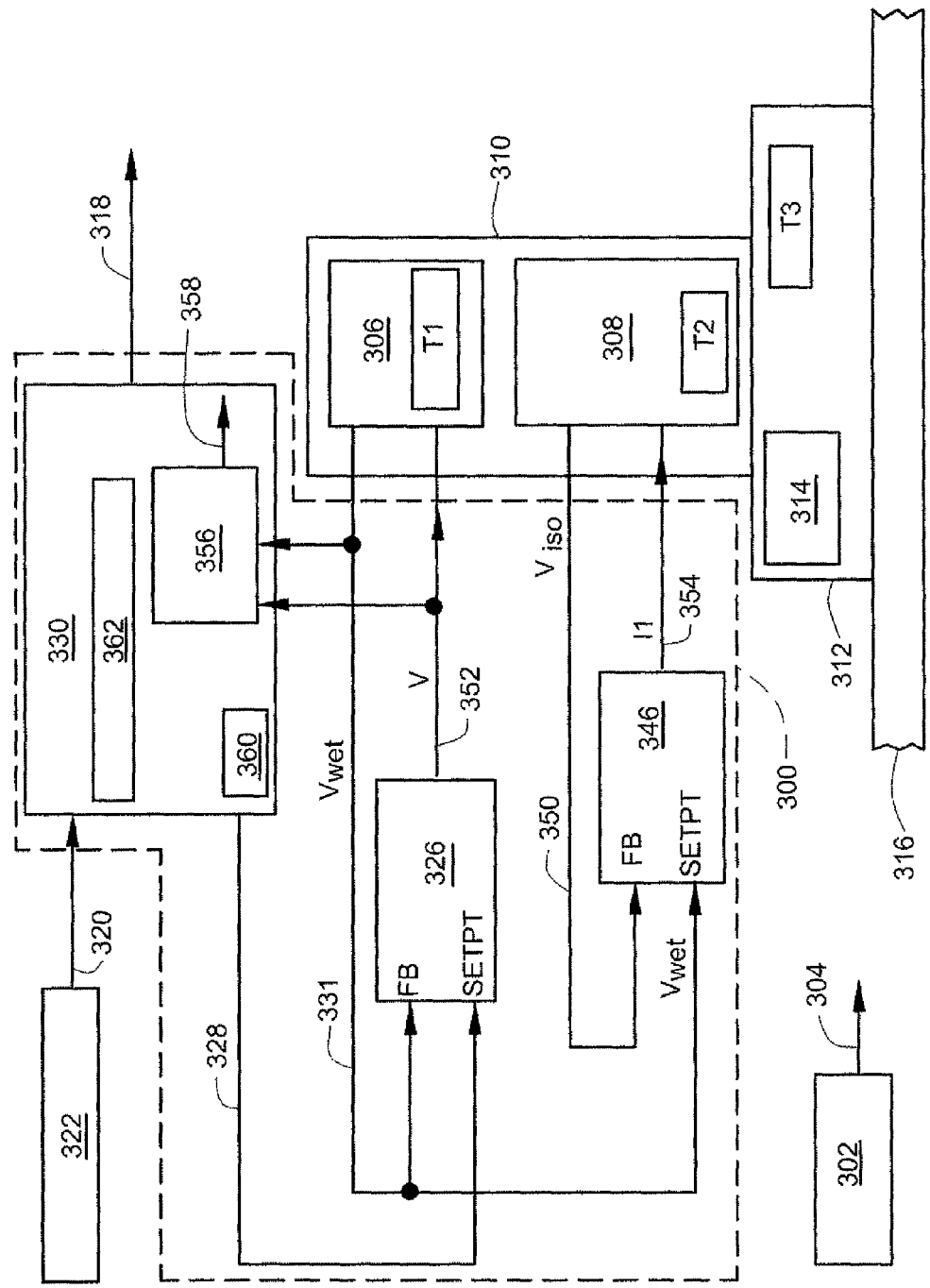
FIG. 6 illustrates an exemplary block diagram of temperature control and detection circuits.

FIG. 6 illustrates an exemplary block diagram of control and detection circuits 300 (corresponding with control and detection circuits 122 of FIG. 1). A power regulator 302 (such as power regulator 120 in FIG. 1) provides one or more regulated power supply voltages 304 to energize the control and detection circuits 300. The control and detection circuits 300 receive air data 320 from one or more air data sensors 322 mounted at other locations on an aircraft.

The control and detection circuits 300 connect to a first resistive sensing element 306 in a detector that has a detector temperature T1. The control and detection circuits 300 connect to a second resistive sensing element 308 in a thermal isolation pedestal that has a thermal isolation pedestal temperature T2. The elements 306 and 308 are in an assembly 310 that corresponds to the assemblies 108 or 103 in FIG. 2 or 3.

The assembly 310 is mounted to a strut 312 that has a strut temperature T3. The strut 312 comprises a deicing heater 314 that is energized by the power regulator 302. The strut 312 is mounted to an aircraft skin 316.

The control and detection circuits 300 generate an impending icing condition output 318. The impending icing condition output 318 couples to an avionic system on the aircraft to alert a pilot to impending icing conditions, to turn on aircraft deicing systems, or both. According to one aspect, the air data 320 and the impending icing condition output 318 are coupled via a data bus to the avionic system. According to other aspects the data comprises a bus that uses CANBUS or ARINC bus protocols.

The circuits 300 comprise a detector temperature controller 326 that provides a controlled voltage V 352 to the first resistive sensing element 306. The detector temperature controller 326 receives a detector set point voltage 328 at a setpoint input (SETPT) from a computer 330. According to one aspect the detector set point 328 corresponds to a total air temperature (from air data sensors 322) plus an offset of 80 degrees centigrade. The detector temperature controller 326 receives a sensed detector element voltage Vwet 331 at a feedback input (FB). The detector temperature controller 326 controls the controlled voltage V 352 as a function of the detector temperature setpoint 328 and the sensed detector element voltage Vwet 331. The detector temperature controller 326 increases the voltage V 352 until the voltage Vwet 331 is equal to the detector set point voltage 328 within a range of regulation of the detector temperature controller 326.

The circuits 300 comprise an isolation temperature controller 346 that provides a controlled current I1 to the second resistive sensing element 308. The isolation temperature controller 346 receives the sensed detector element voltage Vwet 331 at a setpoint input (SETPT). The isolation temperature controller 346 receives a sensed isolation element voltage Viso 350 at a feedback input (FB). The isolation temperature controller 346 controls the controlled current I1 as a function of the setpoint Vwet 332 and the sensed isolation element voltage Viso 350. The isolation pedestal temperature T2 is controlled to equal the detector temperature T1 within a regulated temperature range (as explained above in connection with FIG. 4). Since the temperatures T1 and T2 are equal, or nearly equal, there is substantially no net heat flow between the detector element 306 and the isolation pedestal element 312. The isolation temperature controller 346 thus provides active electronic control of thermal isolation of the detector element 306. The detector element 306 is free from heat contamination due to the higher temperature of the heated strut 312. The isolator element 312 is controlled to be at substantially the same temperature as the detector element 306.

The computer 330 comprises a detector power circuit 356. The detector power circuit 356 receives the control voltage V 352 and the voltage Vwet 331. The detector power circuit 356 provides an output 358 that is representative of the power consumption of the first resistive sensing element (detector element) 306. The detector power circuit 356 is described in more detail below by way of an example illustrated in FIG. 14.

The computer 330 stores a detector temperature offset value 360 that is used to generate the detector setpoint 328. The computer stores dry air power data 362 that represents the expected power consumed by the detector element 306 under dry air conditions as a function of the air data 320 which includes an air temperature (such as total air temperature (TAT)) and an airspeed obtained from other sensors on the aircraft. The computer 330 calculates a power consumption difference between the power actually consumed by the detector element 306 and the expected power that would be consumed if the air were dry. The power consumption difference is representative of impending icing conditions. The computer 330 provides the impending icing condition output 318. According to one aspect, the impending icing condition output 318 indicates current impending and actual icing conditions. According to another aspect, the impending icing condition output 318 indicates a length of time that impending icing conditions or actual icing conditions have been present.

Figure 7:
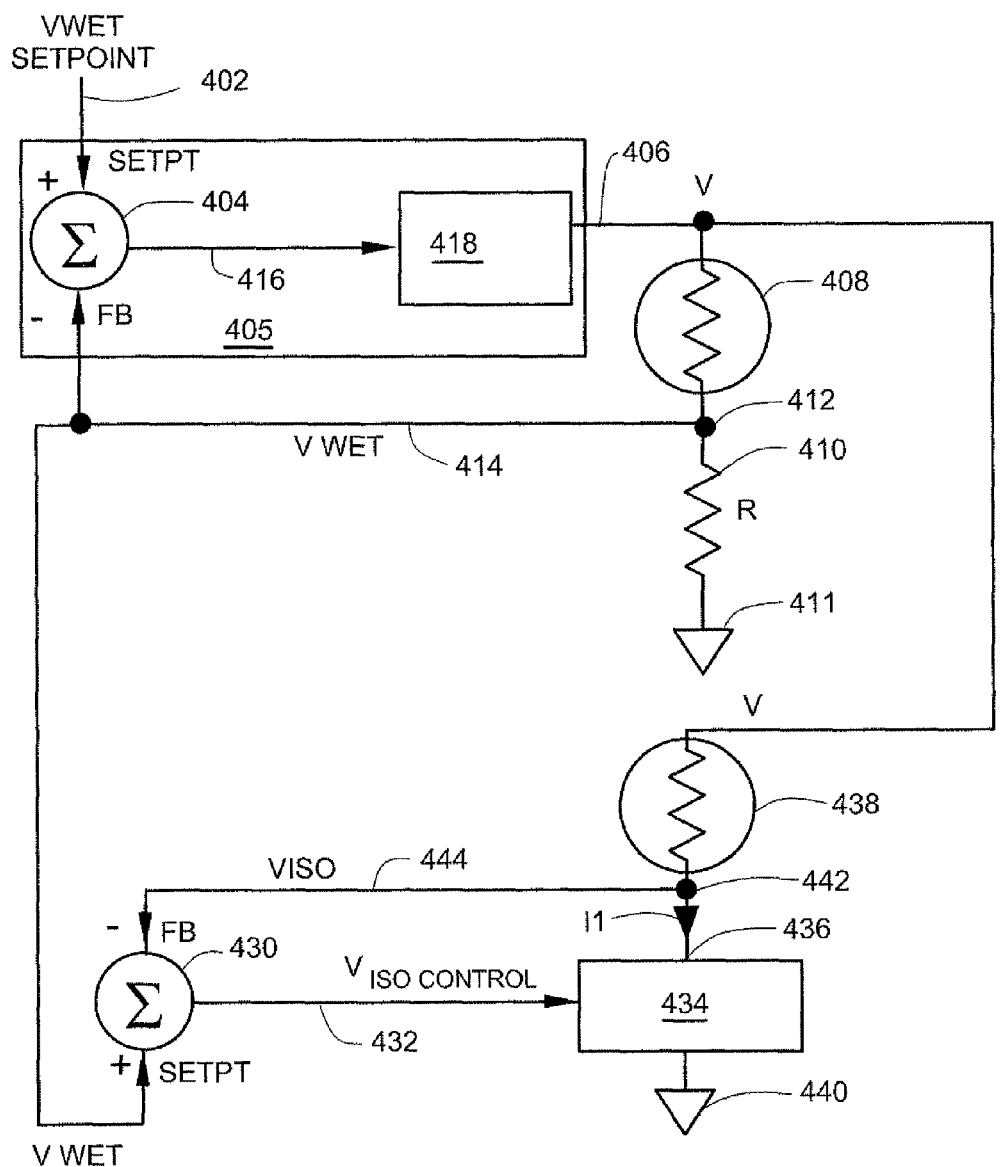
FIGS. 7-9 illustrate alternative examples of temperature control circuitry.

FIG. 7 illustrates a first example of control circuitry that is part of the control and detection circuits 300 in FIG. 6. A computer (such as computer 330 in FIG. 6) provides a Vwetsetpoint voltage 402 to a summing junction (Σ) 404 in a detector temperature controller 405. The detector temperature controller 405 provides a controlled output voltage V 406 to a first resistive sensing element (detector element) 408. The first resistive sensing element 408 is connected in series with a fixed resistor R 410 and circuit common 411 which are part of the control circuitry. A circuit node 412 at the connection of the fixed resistor R 410 and the first resistive sensing element 408 provides a sensed detector voltage Vwet 414. The voltage Vwet 414 is coupled to the summing junction 404 as a feedback input. The summing junction 404 calculates a difference (Vwetsetpoint−Vwet) which forms an error signal 416 that couples to a detector voltage control circuit 418. The detector voltage control circuit 418 provides the voltage V 408 at a level such that Vwet=Vwetsetpoint.

The voltage Vwet 414 is connected as a setpoint to a summing junction (Σ) 430. The summing junction 430 provides a controlled output voltage Visocontrol 432 to an input of a current controller 434. An output 436 of the current controller 434 is connected in series with a second resistive sensing element (such as a PRT) 438, the voltage V and circuit common 440. The current controller 434 controls the current I1 (FIGS. 6, 7). The second resistive sensing element 438 is in a thermal isolation pedestal. A circuit node 442 at the connection of the controller output 436 and the second resistive sensing element 438 provides a sensed thermal isolation pedestal voltage Viso 444. The voltage Viso 444 is coupled to the summing junction 430 as a feedback input. The summing junction 430 calculates a difference (Vwet−Viso) which forms the error signal (controlled output voltage) Visocontrol 432 that couples to an input of the current controller 434. The current controller 434 maintains current through the second resistive sensing element 438 such that the voltage V 406 is at a level such that Viso=Vwet.

Figure 8:
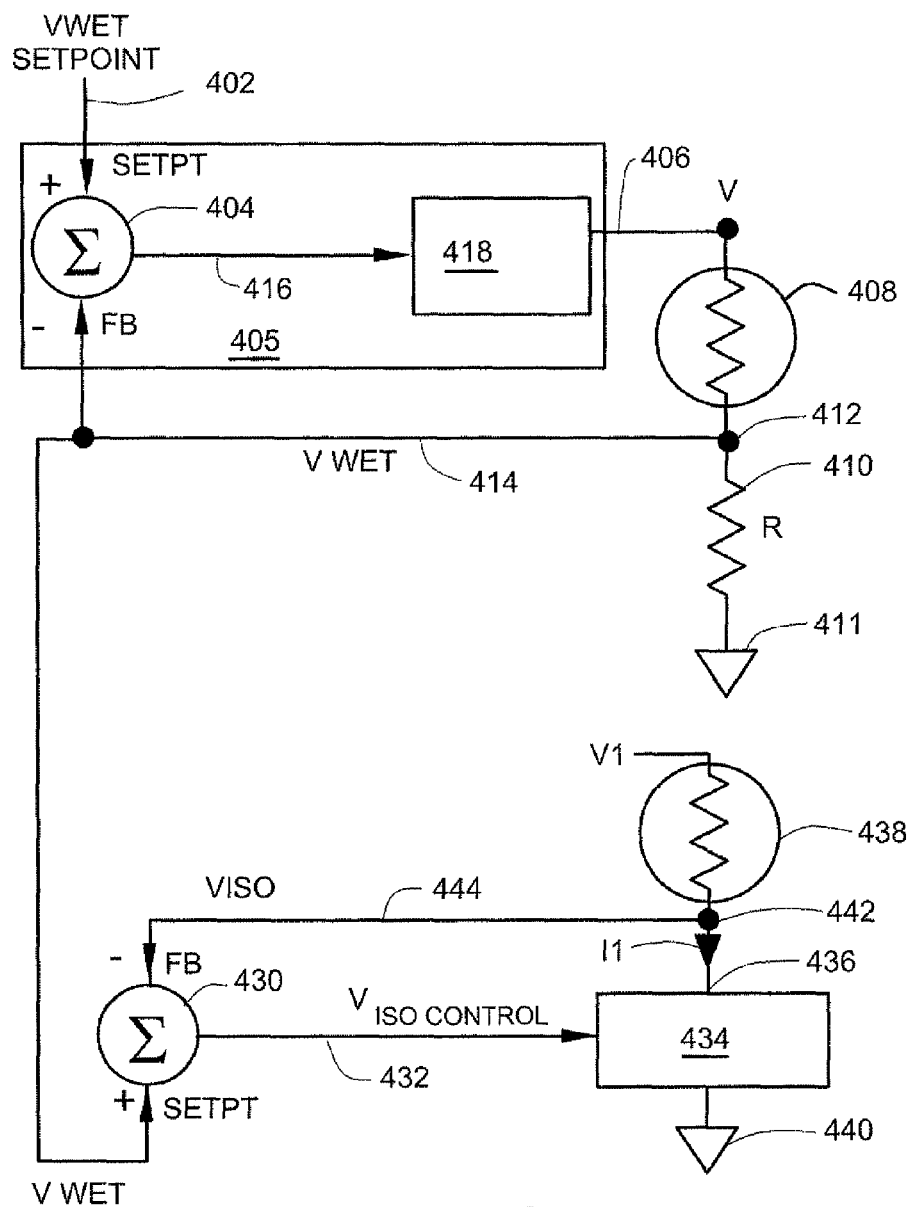

FIG. 8 illustrates a second example of control circuitry that is similar to the control circuitry shown in FIG. 7 except that in FIG. 8 the second resistive sensor 438 is connected to a voltage V1 that is different than the voltage V 406 that is connected to the first resistive sensor 408. In other respects the second example of control circuitry in FIG. 8 is the same as the first example of control circuitry in FIG. 7. The circuitry shown in FIG. 8 has the advantage that the nominal (room temperature) resistances of the first and second resistive sensors 408, 438 can be different from one another and the difference can be compensated by selection of the voltage V1. For the sake of brevity, reference numbers in FIG. 8 are the same as reference numbers in FIG. 7.

Figure 9:
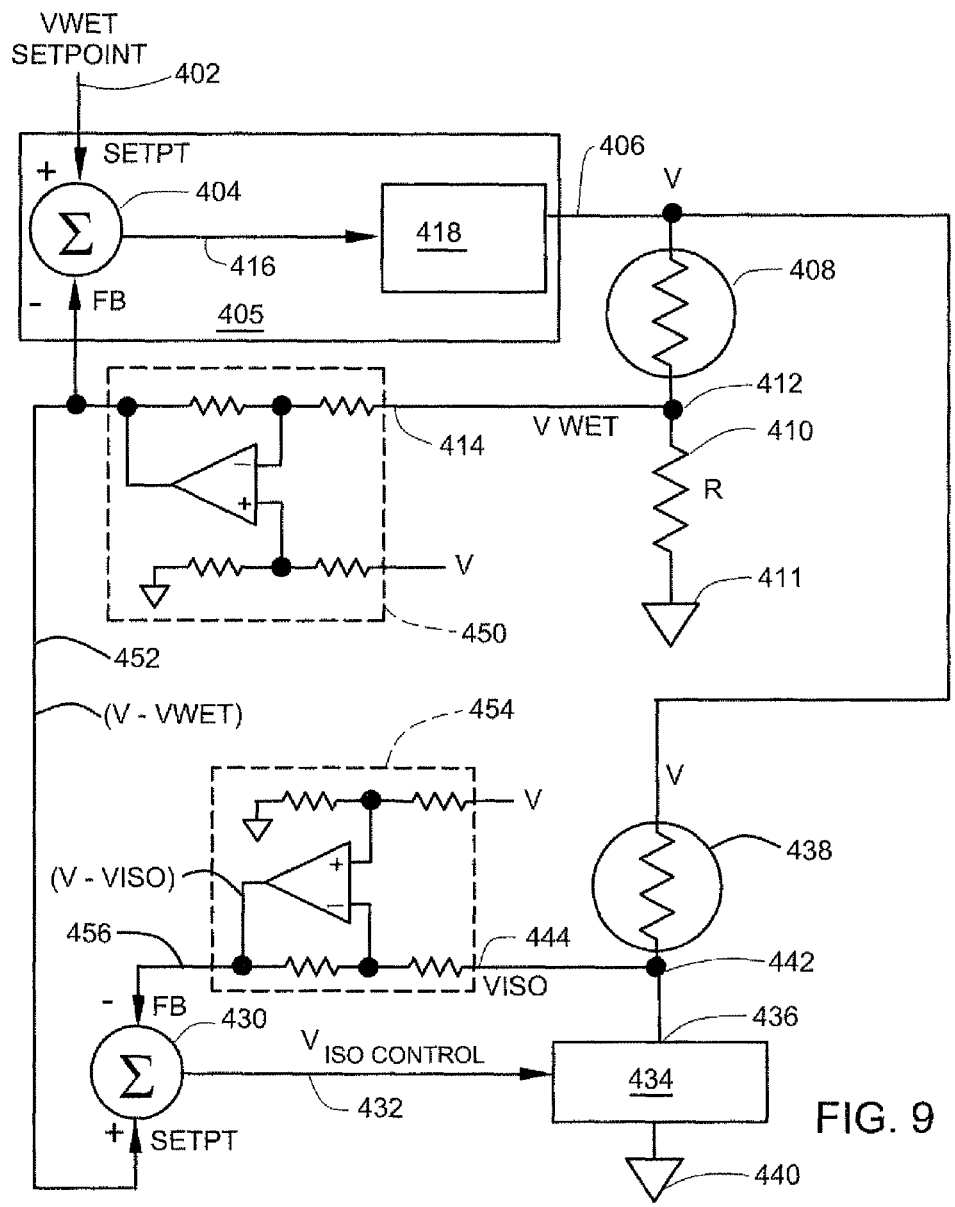

FIG. 9 illustrates a third example of control circuitry that is similar to the control circuitry shown in FIG. 7 except that difference circuits 450, 454 are included in FIG. 9. The difference circuit 450 generates a difference output 452 that represents a difference (V−Vwet). In other words, the difference output 452 represents a voltage drop across first resistive sensing element 408. The difference circuit 454 generates a difference output 456 that represents a difference (V−Viso). In other words, the difference output 456 represents a voltage drop across second resistive sensing element 438. The circuitry shown in FIG. 9 has the advantage that the VWetsetpoint can be scaled directly in terms of a desired voltage drop across the first resistive sensing element 408 and without regard to the resistance R of resistor 410.

Figure 10:
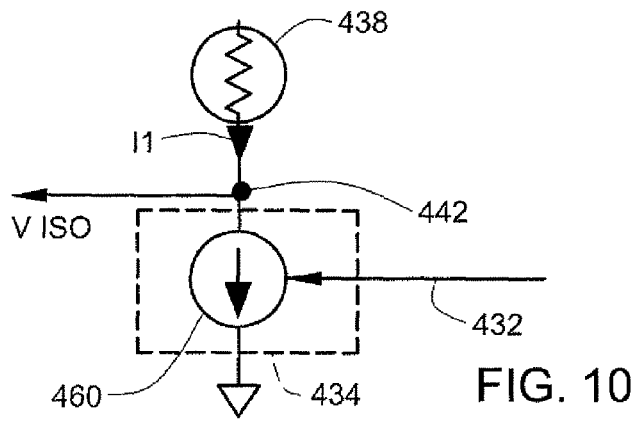
FIGS. 10-12 illustrate alternative examples of current controllers.
Figure 11:
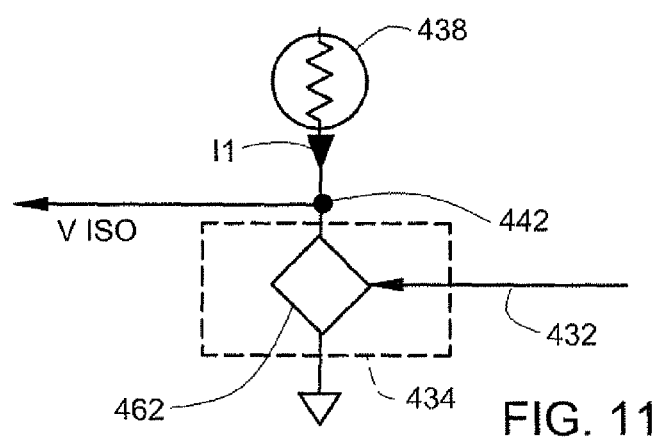
Figure 12:
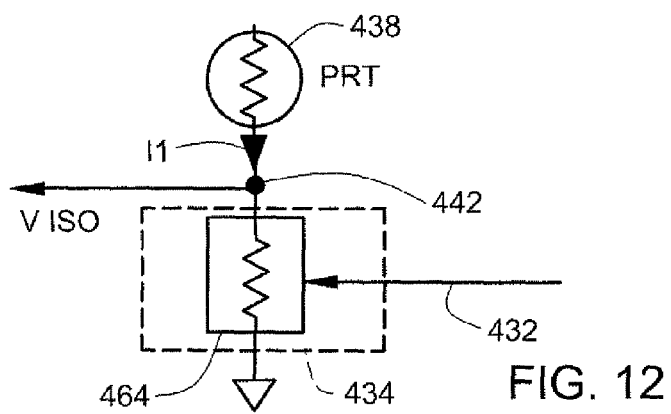

FIGS. 10-12 illustrate alternative embodiments of the current controller 434. In a first example in FIG. 10, the current controller 434 comprises a voltage controlled current source 460. The voltage controlled current source 460 is described in more detail below by way of an example illustrated in FIG. 13. In a second example in FIG. 11, the current controller 434 comprises a voltage controlled voltage source 462. In a third example in FIG. 12, the current controller 434 comprises a voltage controlled resistance 464. According to one aspect, the voltage controlled resistance 464 comprises a field effect transistor (FET) voltage controlled resistor.

Figure 13:
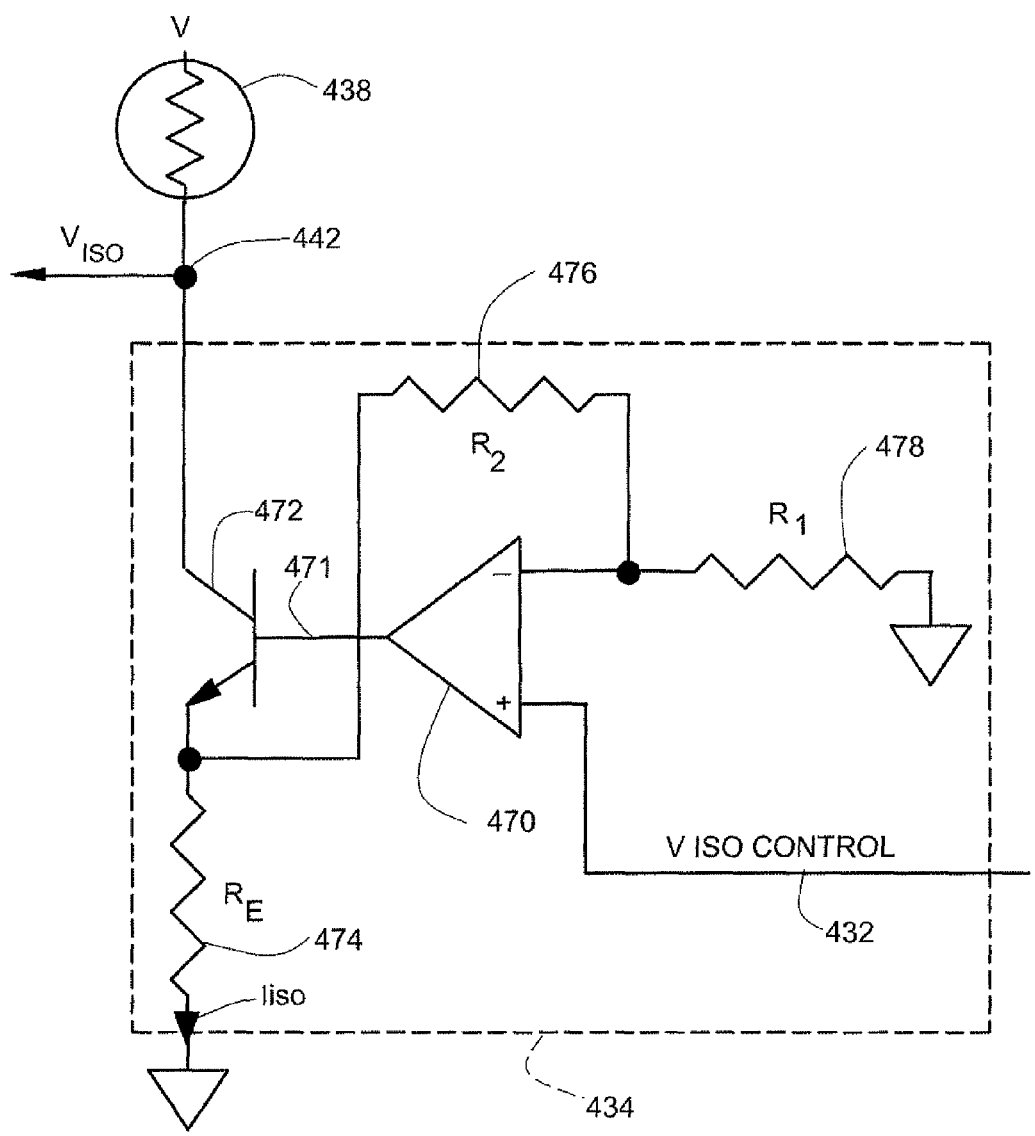
FIG. 13 illustrates a current controller that includes a bipolar junction transistor.

FIG. 13 illustrates a current controller 434 that comprises a voltage controlled current source circuit. Visocontrol 432 (from FIG. 6) is coupled to a non-inverting input of an operational amplifier 470. The operational amplifier 470 provides an amplifier output 471 to a base of a bipolar junction transistor 472. An emitter of the transistor 472 is coupled through an emitter resistor $R_E$ 474 to a common conductor. A feedback voltage across resistor $R_E$ 474 is proportional to current through the emitter of the transistor 472. The feedback voltage is coupled to a voltage divider circuit comprising resistors R1 478 and R2 476. The voltage divider is coupled to an inverting input of the operational amplifier 470 to provide feedback so that current through resistor $R_E$ 474 is controlled as a function of voltage Visocontrol 432.

Since platinum resistance thermometers (PRT's) have a well-behaved resistance change with temperature, the voltage V is controlled to maintain the wet PRT resistance Rwet (FIG. 7) at a value consistent with its desired temperature. That is, knowledge of R (FIG. 7) and Vwet can be used to calculate Rwet and thereby temperature. Riso is controlled to equal Rwet. Rwet can be calculated by Equation 1:

$$R_{WET} = R\left(\frac{V}{V_{WET}} - 1\right) \quad \text{Equation 1}$$

Riso can be calculated by Equation 2:

$$R_{ISO} = \left(\frac{V - V_{ISO}}{I_{ISO}}\right) \quad \text{Equation 2}$$

Therefore, knowing the value of V and Viso, the isolation resistance Riso can be made equal to Rwet by controlling I1. FIG. 13 shows one embodiment of a control circuit in which the isolation control is a voltage controlled current source. The use of operational amplifier 470 makes the current control independent of temperature effects from a base-emitter junction of transistor 472. When R1=R2, then Iiso is as shown in Equation 3:

$$I_{ISO} = \left(\frac{2V_{ISOCONTROL}}{R_E}\right). \quad \text{Equation 3}$$

Equations 1, 2 and 3 implement the desired control that sets the thermal isolation pedestal temperature equal to the temperature of the detector.

Figure 14:
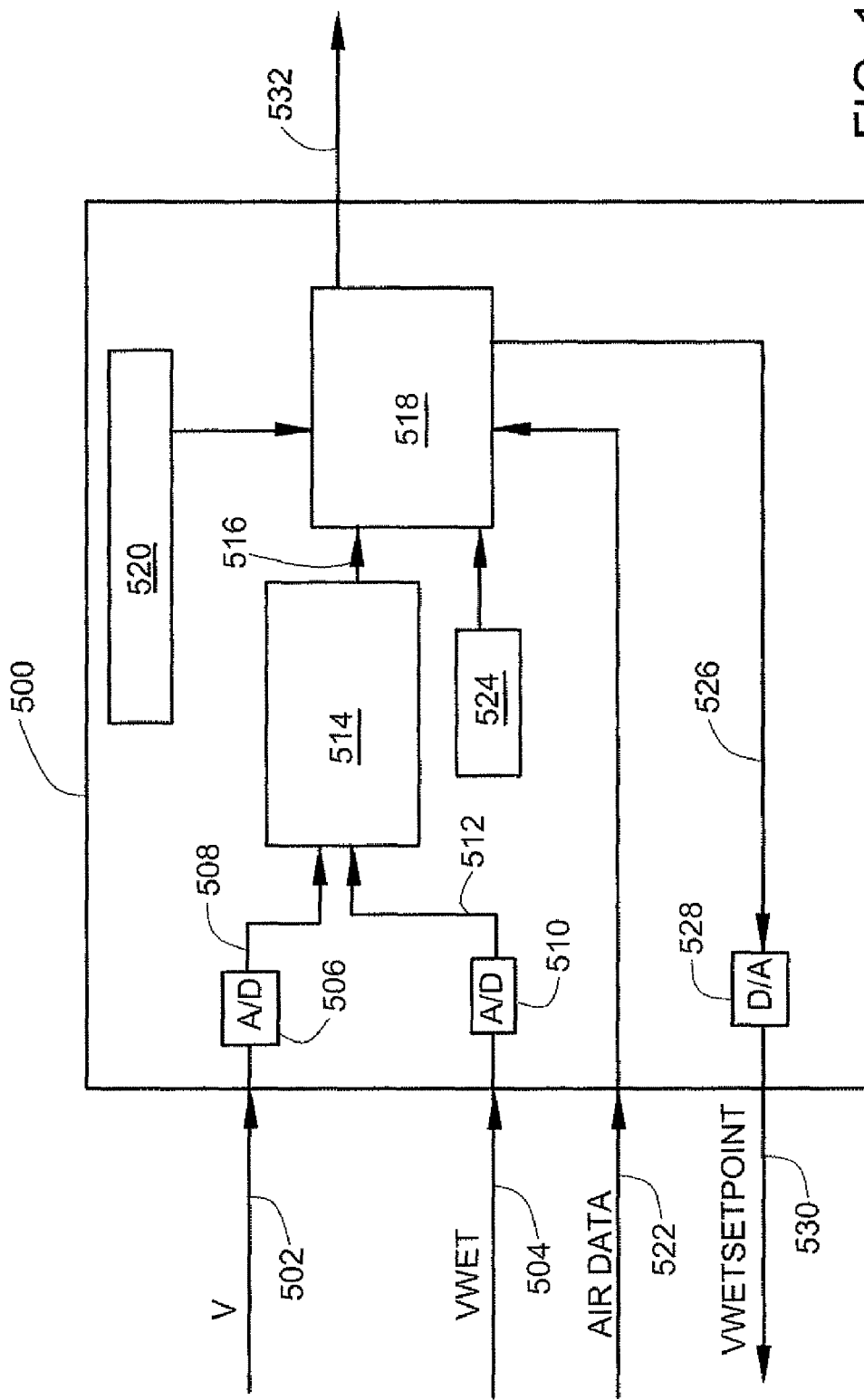
FIG. 14 illustrates a block diagram of a computer.

FIG. 14 illustrates a block diagram of a computer 500 corresponding with the computer 330 in FIG. 6. The computer 500 receives analog input voltage V at 502 and analog input voltage Vwet at 504. An analog to digital converter (A/D) 506 converts the analog voltage V to a first digital representation 508 of the analog voltage V. An analog to digital converter (A/D) 510 converts the analog voltage Vwet to a second digital representation 512 of the analog voltage Vwet. A detector power circuit 514 receives the digital representations 508, 512 and provides an output 516 that is representative of power consumption of a first resistive sensor element (such as element 142) in a detector (such as detector 102). The output 516 that is representative of power consumption couples to a processor 518.

The processor 518 receives dry air power data 520 that is stored in a memory in the computer 500. The processor 518 also receives air data at 522. The air data 522 is provided by air data sensors that are not part of an icing condition probe. The air data 522 includes air speed and air temperature conditions. The air data 522 is used to access a dry data power value of dry power data 520 that is specific to the received air data 522. The processor 518 compares the dry data power value and the output 516 that is representative of power consumption to ascertain whether there is water in the air flow that is increasing convective heat loss. If the convective heat loss exceeds a threshold set by the dry data power value, the processor actuates an output 532 to warn of impending icing conditions if the air is cold enough. If the air temperature is cold enough and if water is detected in the airstream by detection of excessive heat loss, then the probability of impending future icing is high, and a warning is provided.

The computer 500 comprises an offset 524 that is stored in memory. The offset 524 couples to the processor 518. The processor 518 calculates a wet set point 526 that couples to an analog to digital (A/D) converter 528. The wet set point is calculated as a function of the offset 524 and the air temperature information from air data at 522. The analog to digital converter 528 generates voltage Vwet set point 530 (corresponding to Vwet set point 328 in FIG. 6).

Figure 15:
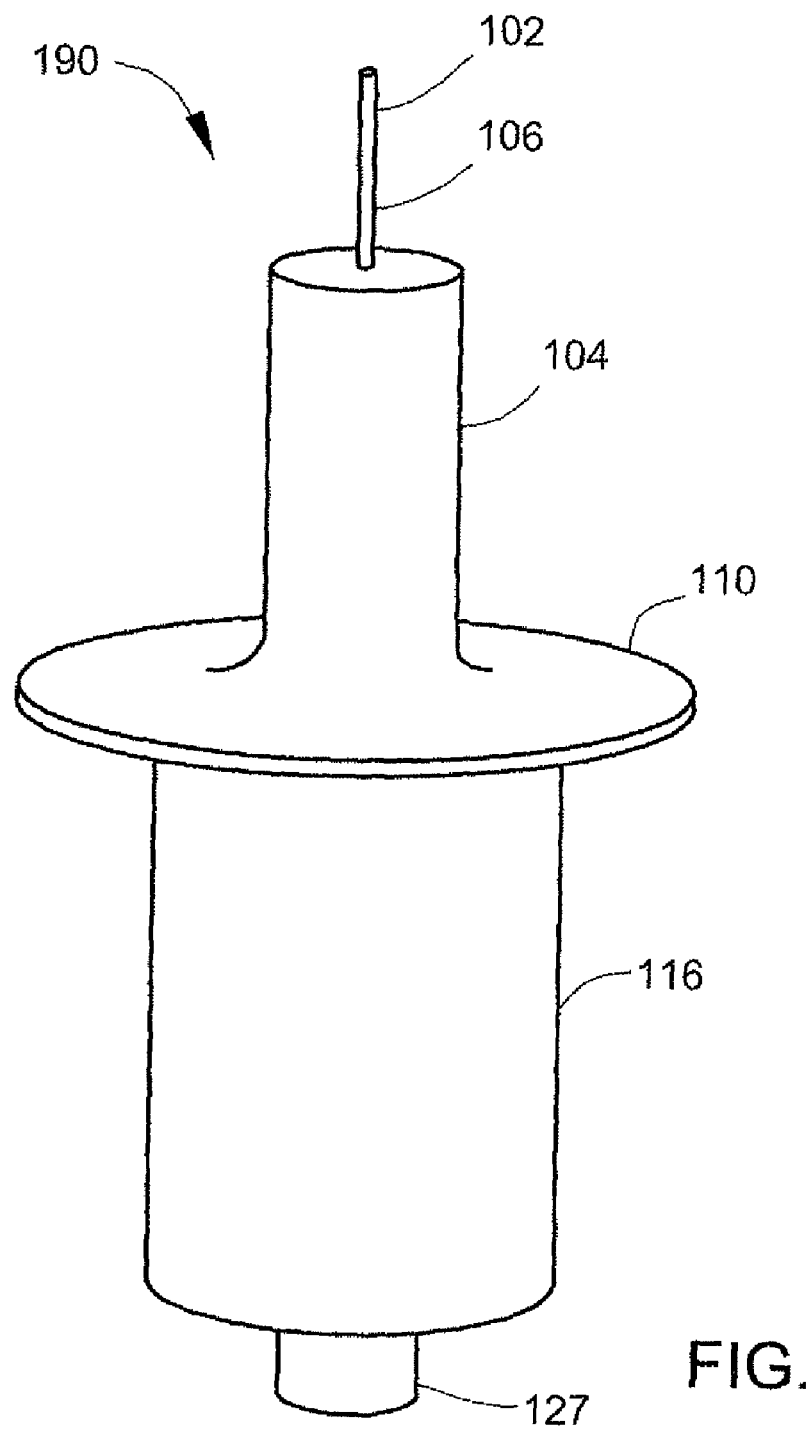
FIG. 15 illustrates an oblique view of a first probe.

FIG. 15 illustrates a first probe embodiment 190 of the probe 100, shown in an oblique view. The probe 190 comprises a strut 140 that has a right circular cylinder cross section that is symmetrical and insensitive to angle of attack.

Figure 16:
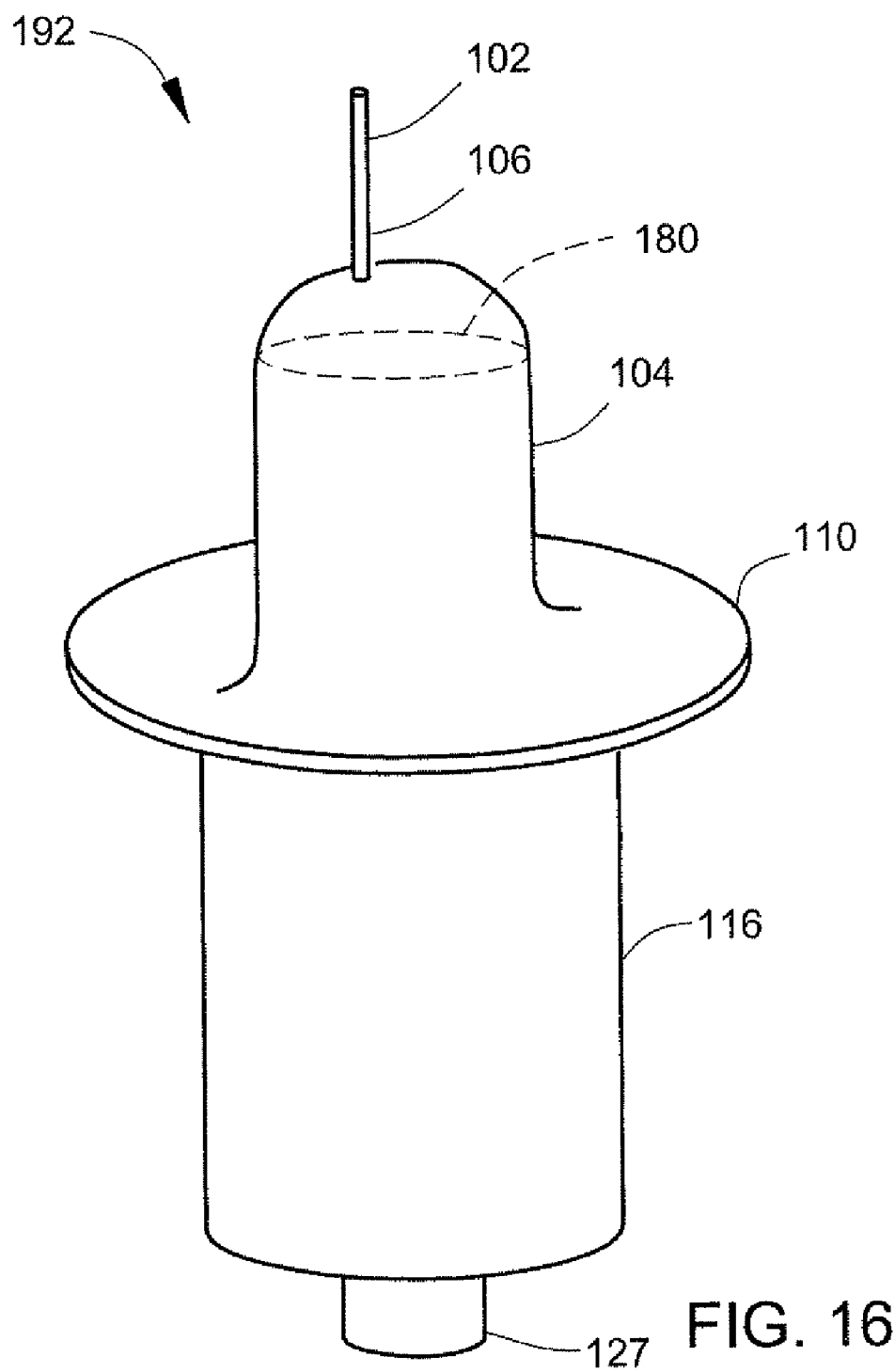
FIG. 16 illustrates an oblique view of a second probe.

FIG. 16 illustrates a second probe embodiment 192 of the probe 100, shown in an oblique view. The probe 190 comprises a strut 140 that has a swept, elongated aerodynamic cross section 180 that has a reduced aerodynamic drag. The strut 104 is shaped so as not to create airflow disturbances as the angle of attack varies during flight.

Figure 17:
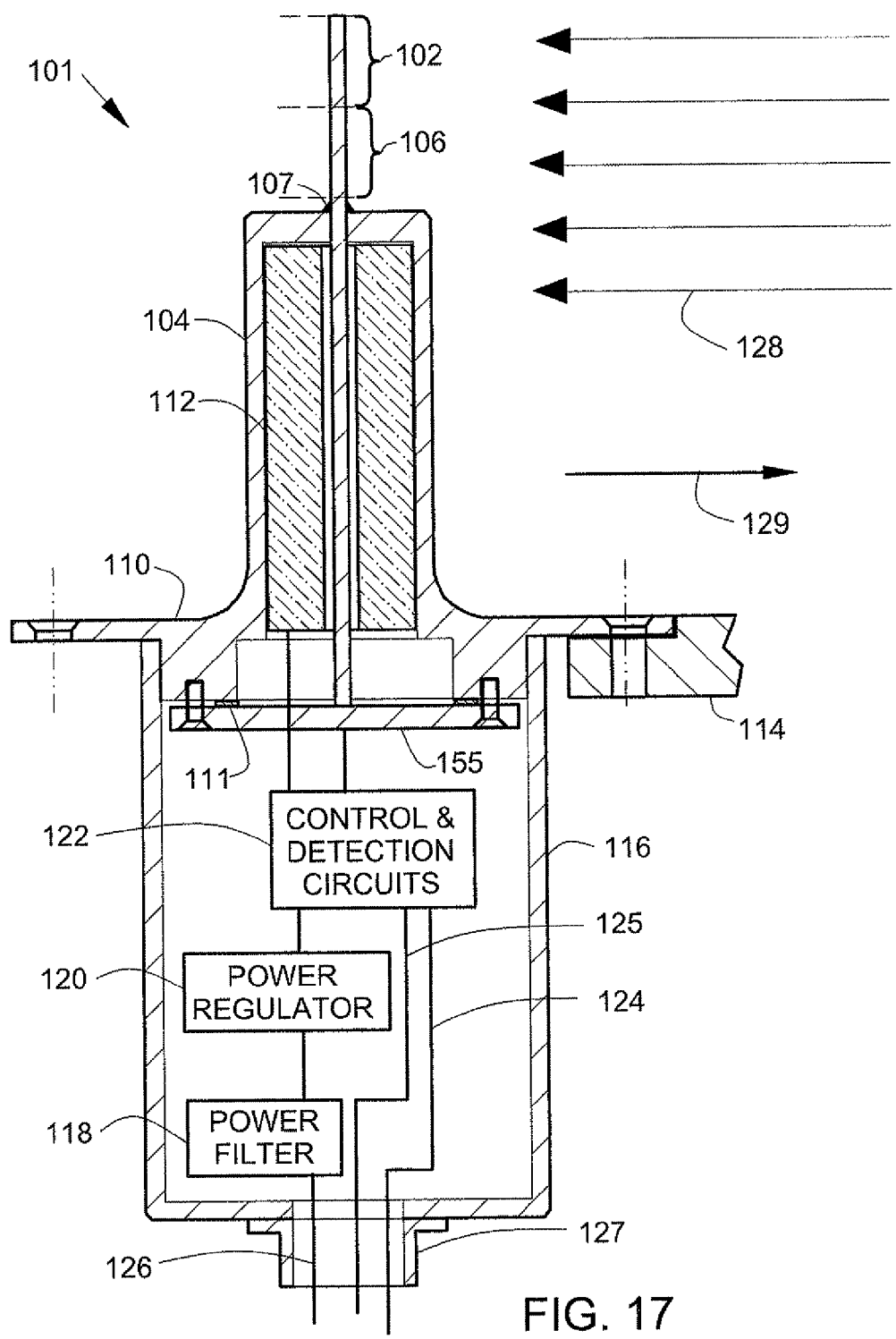
FIG. 17 illustrates an alternative thermal icing condition probe.

FIG. 17 illustrates an alternative thermal icing condition probe 101. The thermal icing condition probe 101 is similar to the thermal icing condition probe 100 in FIG. 1. Reference number used in FIG. 17 that are the same as reference numbers used in FIG. 1 identify the same or similar components in both FIGS. 1 and 17. In FIG. 17, an assembly of a detector 102 and a thermal isolation pedestal 106 extends through a central region surrounded by a strut heater 112 to an annular flange 155 that is inside an electronics housing 116. A seal 107 (such as epoxy environmental seal) seals an opening in a strut 104.

A seal 111 (such as a metal-to-metal seal or an O ring) seals the annular flange 155 to a strut mount 110. In other respects the thermal icing condition probe 101 is similar to the thermal icing condition probe 100 in FIG. 1.

While numerous characteristics and advantages of various aspects of the invention have been set forth in the above description, the disclosure is illustrative only, and changes may be made in form and structure without departing from the scope and spirit of the present invention.

What is claimed is:

1. An icing condition probe, comprising:
   a detector that includes a first resistive sensing element that is powered to maintain a regulated detector temperature, the first resistive sensing element providing a probe output that represents detector power consumption as an indication of impending icing conditions in an air flow;
   a strut that has a strut mount adapted to mount to an aircraft skin and that includes a strut heater; and
   a thermal isolation pedestal that is mounted on the strut and that supports the detector in the air flow, the thermal isolation pedestal including a second resistive sensing element that is powered to maintain a regulated thermal isolation pedestal temperature that is equal to the regulated detector temperature within a regulated temperature range.

2. The icing condition probe of claim 1 wherein the thermal isolation pedestal thermally isolates the detector from a temperature variation of the strut.

3. The icing condition probe of claim 1, wherein the detector comprises:
   a generally round cylindrical external surface that has a major axis that is transverse to a forward axis of the probe.

4. The icing condition probe of claim 3 wherein the direction of air flow remains transverse to the major axis over a range of angles of attack of the air flow.

5. The icing condition probe of claim 1 wherein the detector is supported in a position outside of an airflow boundary layer adjacent the strut mount.

6. The icing condition probe of claim 1 wherein the strut comprises an external strut housing that comprises a metal alloy.

7. The icing condition probe of claim 1 wherein the detector power consumption varies as a function of a mass flow and temperature of the air flow.

8. The icing condition probe of claim 1 wherein the probe does not comprise a dry air detector for detection of dry air power consumption.

9. The icing condition probe of claim 1 wherein the thermal isolation pedestal comprises:
   a second cylindrical external surface that has a major axis that is transverse to a forward axis of the probe.

10. The icing condition probe of claim 1 wherein the thermal isolation pedestal and the detector have substantially the same external cylindrical diameter.

11. The icing condition probe of claim 1 wherein the thermal isolation pedestal has a first external cylindrical diameter that is larger than a second external cylindrical diameter of the detector.

12. An icing condition detection system, comprising:
    a single element detector;
    a circuit that provides an output representing impending icing conditions as a function of power consumption of the single element detector;
    a thermal isolation pedestal that includes a detector support end that supports the single element detector and an opposite strut mounting end; and
    a thermal isolation controller that controls a thermal isolation pedestal temperature to thermally isolate the single element detector from the strut mounting end.

13. The icing condition detection system of claim 12 wherein the thermal isolation controller controls the thermal isolation pedestal temperature to equal the temperature of the single element detector within a regulated temperature range.

14. The icing condition detection system of claim 12 wherein the thermal isolation controller controls the thermal isolation pedestal temperature to minimize conduction of heat between the single element detector and the thermal isolation pedestal.

15. The icing condition detection system of claim 12 wherein the single element detector is heated to a temperature that is offset above a temperature of the air flow, preventing ice formation on the single element detector.

16. A method, comprising:
    providing a single element detector;
    providing an output representing impending icing conditions as a function of power consumption of the single element detector;
    providing a thermal isolation pedestal supporting the single element detector in a position outside of a boundary layer adjacent an aircraft skin; and
    controlling a thermal isolation pedestal temperature to thermally isolate the single element detector.

17. The method of claim 16 and further comprising:
    heating the single element detector to a temperature high enough to prevent ice formation.

18. The method of claim 16 and further comprising:
    controlling the thermal isolation pedestal temperature to minimize conduction of heat between the single element detector and the thermal isolation pedestal.

19. The method of claim 16 and further comprising:
    controlling the thermal isolation pedestal temperature to equal the temperature of the single element detector within a regulated temperature range.

20. The method of claim 16 and further comprising:
    supporting the single element detector in a position outside of the boundary layer.

* * * * *